United States Patent
Bauer et al.

(10) Patent No.: US 8,164,215 B2
(45) Date of Patent: Apr. 24, 2012

(54) SYSTEM FOR CONTACT LESS DATA AND POWER TRANSMISSION

(75) Inventors: Hans-Achim Bauer, Hamburg (DE); Andre Zybala, Hanstedt (DE)

(73) Assignee: Airbus Operations GmbH (DE)

( * ) Notice: Subject to any disclaimer, the term of this patent is extended or adjusted under 35 U.S.C. 154(b) by 330 days.

(21) Appl. No.: 12/468,262

(22) Filed: May 19, 2009

(65) Prior Publication Data

US 2009/0295223 A1 Dec. 3, 2009

Related U.S. Application Data

(60) Provisional application No. 61/128,090, filed on May 19, 2008.

(30) Foreign Application Priority Data

May 19, 2008 (DE) .................... 10 2008 024 217

(51) Int. Cl.
*B60L 1/00* (2006.01)
(52) U.S. Cl. ............... 307/9.1; 307/104; 307/17
(58) Field of Classification Search .......... 307/9.1, 307/10.1, 17, 104
See application file for complete search history.

(56) References Cited

U.S. PATENT DOCUMENTS

| | | | |
|---|---|---|---|
| 4,833,337 A | 5/1989 | Kelley et al. | |
| 4,853,555 A | 8/1989 | Wheat | |
| 5,696,409 A * | 12/1997 | Handman et al. | 307/10.1 |
| 5,856,710 A * | 1/1999 | Baughman et al. | 307/10.1 |
| 5,890,779 A * | 4/1999 | Blackburn et al. | 307/10.1 |
| 6,008,547 A | 12/1999 | Dobler et al. | |
| 6,222,443 B1 * | 4/2001 | Beeson et al. | 340/431 |
| 7,432,622 B2 * | 10/2008 | Griepentrog et al. | 310/112 |
| 7,543,490 B2 * | 6/2009 | Rey et al. | 73/146 |
| 7,627,288 B2 * | 12/2009 | Iida | 455/41.1 |
| 2007/0176394 A1 | 8/2007 | Gehring et al. | |

FOREIGN PATENT DOCUMENTS

| | | |
|---|---|---|
| DE | 3783841 T2 | 5/1993 |
| DE | 4344071 A1 | 7/1995 |
| DE | 19743313 C1 | 12/1998 |
| DE | 19753467 A1 | 8/1999 |
| DE | 10103280 A1 | 8/2002 |
| DE | 10347561 B3 | 1/2005 |
| EP | 0260725 A2 | 3/1988 |
| EP | 0862524 B1 | 9/1998 |
| GB | 2383879 A | 7/2003 |
| WO | 2007/063500 A2 | 6/2007 |

* cited by examiner

*Primary Examiner* — Fritz M Fleming
(74) *Attorney, Agent, or Firm* — Lerner, David, Littenberg, Krumholz & Mentlik, LLP

(57) ABSTRACT

A system for contactless data and power transmission between a first vehicle component and a second vehicle component includes a first control unit, a second control unit, and a transducer with a primary winding and a secondary winding. The first control unit is adapted to generate an alternating voltage at a signal output port from a voltage present at a voltage input port, where the frequency of the alternating voltage is modulated depending on the data that is input at a data input port, and wherein the second control unit is adapted to demodulate the data and provide it at the data output port.

8 Claims, 4 Drawing Sheets

SYSTEM FOR CONTACT LESS DATA AND POWER TRANSMISSION

CROSS-REFERENCE TO RELATED APPLICATIONS

This application claims the benefit of the filing date of U.S. Provisional Patent Application No. 61/128,090 filed May 19, 2008, the disclosure of which is hereby incorporated herein by reference.

BACKGROUND OF THE INVENTION

The invention relates to a system for contactless data- and power transmission between a first vehicle component and a second vehicle component.

In order to provide as flexible as possible a reconfigurability of a cabin of a vehicle that comprises, for example, a modular seating concept with seats that may be affixed in various positions, it has to be possible to electrically couple, to fixed vehicle components, the electrical and electronic devices that are usually located in the seats in all the provided seating positions in the cabin. For example, in a passenger cabin of a modern commercial aircraft it is necessary to provide a very large number of passenger seats or passenger seat groups with electrical current and data so that numerous convenience functions, for example the provision of audio entertainment programs and illumination etc., become possible. The use of a wired connection solution between the individual passenger seats and the cabin floor, which solution is, for example, implemented by way of two or more separate cables for electricity and data, usually involves relatively large and heavy plug-and-socket connectors because they are more easily maintainable and installable and are relatively fail-safe. Furthermore, for each connecting cable a lead-through path and installation space must be found in which the cable may be installed so as to be safe and secure as well as invisible to passengers. Furthermore, due to sealing requirements between the passenger compartment and the freight compartment, cable infeed routes to the seats through the floor panel of the cabin floor by means of cut-outs or drill holes may only be implemented with increased construction effort and weight. While it is possible to provide covered cable infeed routes by way of cable ducts on the floor, they are, however, associated with a disadvantage in that each cable duct forms a small uneven area, and consequently passenger convenience may be limited to a significant extent. Generally speaking, any surfaces where people tread within a passenger cabin are preferably to be constructed without any uneven areas. Moreover, in the case of wired variably-installable seats it is necessary to provide adequate cable lengths, which may be stowed in the seats or cable ducts, in order to make it possible to vary the seat pitch to connecting points or lead-through regions in the floor. This is also associated with increased weight.

Generally speaking this problem relating to the flexible reconfigurability is not limited to variable cabling of passenger seats in an aircraft, but instead extends to every imaginable vehicle component. In the special case of a passenger cabin of an aircraft this would, for example, also relate to the passenger service units (PSUs) which above the seats or the seat groups provide illumination, signal displays, for example Fasten Seatbelt icons and No Smoking icons, and the like.

EP 0 862 524 proposes an arrangement for contactless signal transmission between vehicle components that may be moved in a linear manner relative to each other. A rail-like transmission device is shown in which signals may be transmitted between a fixed vehicle component and a vehicle that is movable in a linear manner relative to the former. This is implemented with the use of primary windings and secondary windings in pot cores that are separate from each other, which are preferably designed as rails that slide along each other, which rails comprise profiles that are used to form a closed magnetic circuit between the primary winding and the secondary winding. In principle this arrangement is suitable for supplying electrical power to various electrical devices, for example a seat heater or an electrical seat adjustment device of a vehicle seat, or for transmitting signals, for example for seat occupant detection. However, an arrangement designed in this way is associated with a disadvantage in that all the supply signals and the electrical power need to be transmitted separately from each other. Thus several of the rail-like transmission devices need to be provided if electrical power or control signals is/are to be supplied to several electrical devices in the vehicle seat. This is disadvantageous for reasons of weight and cost, in particular if a very large number of passenger seats or other vehicle components need to be equipped with such arrangements for contactless signal transmission.

In U.S. Pat. No. 4,833,337 a system for the transmission of electrical power from a fixed vehicle component to a movable vehicle component is proposed, in which system a U-shaped core with windings extends in a core with receiving recesses. By dividing the windings affixed to the vehicle into several segments the stray magnetic field may be reduced, because it is not necessary to supply electrical power at the same time to all the segments. However, this proposed system, too, does not provide for any coupling between the transmission of electrical power and of data. Such transmissions may only take place separately from each other.

SUMMARY OF THE INVENTION

A system according to the characteristics of the independent claim 1 may provide for reducing or entirely eliminating the above-mentioned disadvantages. In particular it may provide for a system for contactless transmission of electrical power and data, which system is as simple as possible in design, if possible only one magnetic circuit for simultaneous transmission of electrical power and any data, with the system moreover being robust and light in weight.

A system for contactless data- and power transmission between a first vehicle component and a second vehicle component is proposed. The system according to the invention comprises at least one first control unit with a voltage input port, a data input port and a signal output port, at least one second control unit with a signal input port, a data output port and a voltage output port, as well as at least one transducer with a primary winding in a first core and a secondary winding in a second core. According to the invention, the primary winding may be connected to the signal output port of the first control unit, and the secondary winding may be connected to the signal input port of the second control unit. The first control unit is adapted to generate an alternating voltage at the signal output port, from an electrical voltage present at the voltage input port, with the frequency of said alternating voltage being modulated depending on the data that is input at the data input port. According to the present invention, the second control unit is adapted to demodulate the data and provide it at the data output port, from the frequency-modulated alternating voltage present at the signal input port, which alternating voltage is transmitted by way of the secondary winding to the signal input port. Furthermore, the second control unit is adapted to provide a voltage at the voltage output port, which voltage has been prepared for further use in an electrical consumer.

Accordingly, in the first control unit an alternating voltage is generated, onto which the data to be transmitted is modulated in the form of a frequency change. The frequency-modulated alternating voltage formed in this way is conducted to the primary winding, which for the purpose of transmission forms a magnetic circuit with a secondary winding. The secondary winding in turn conducts the frequency-modulated alternating voltage induced from the magnetic circuit to a second control unit, which from the frequency modulation may demodulate the transmitted data. Furthermore, the induced alternating voltage present in the second control unit may be prepared in such a way that it is, for example, present at a constant predetermined frequency or as direct voltage, so that it may be used for operating electrical consumers. Accordingly, by way of a single combination comprising a primary winding and a secondary winding, a simultaneous complete transmission of electrical power and of data may be achieved without the need to use a multitude of electromagnetic transducers; consequently the proposed design has a positive effect on both weight and costs. Systems for the modulation and demodulation of data or of any signals are well known from the state of the art so that sufficiently robust and cost-effective control units for modulation and demodulation are realistic.

Advantageous improvements are set out in the subclaims. Particularly noteworthy in this are some characteristics according to the invention that comprise a number of advantages when compared to devices from prior art. For example, it is advantageous to accommodate several separate coils of primary windings in each case in a core, and to accommodate these coils, so that they are immovably installed in the vehicle, as primary elements in predetermined positions. The primary windings or primary elements could then be arranged so that they are distributed on or in the first vehicle component. This arrangement could be designed as a linear, curved, circular-arc-shaped or any other distribution. In principle the distribution depends on the location on the first vehicle component where data transmission might be desired. It is possible to couple to the primary elements secondary elements that are designed so as to be analogous to the primary elements. For example a vehicle component could be equipped with one or several secondary elements so that in the preferred positions of the vehicle component, in each case, a secondary element is directly adjacent (above, beside or the like). This secondary element could then form a magnetic circuit with the adjacent primary element, so that power- and data transmission may take place between the secondary element and the corresponding primary element. If a grid for the positioning of vehicle components has been specified, it has to be possible in each case to position a secondary element within this grid directly above a primary element.

Furthermore, the primary elements are preferably integrated in fixed installations in the vehicle, for example a floor of a cabin, so that they remain invisible from the outside, so that no expensive covers for open magnet rails need to be provided, and so that a uniform surface is provided within the entire cabin. Preferably, the primary elements are positioned as closely as possible to a surface of the floor, which surface faces the seats. If magnetically permeable floor panels are used, for example comprising a honeycomb core structure made of glass-fibre reinforced plastic, the primary elements could also be arranged entirely underneath the floor panels.

Furthermore, preferably at least one secondary element is arranged in a vehicle seat, wherein the secondary element may be positioned as far as possible on the underside of the vehicle seat so as to establish a magnetic circuit with a primary element situated in the cabin floor. In order to take into account a specified grid within the cabin, in which grid the passenger seats may be attached, in a further preferred embodiment the secondary element is held so as to be movable and lockable so that a smaller number of primary elements need to be provided as fixed installations in the vehicle, and so that secondary elements in vehicle seats are slidable, within certain limits, directly above a primary element.

In a further advantageous embodiment, elongated primary elements are provided, which in each case themselves cover a certain fixed region in the vehicle and are suitable for the establishment of a magnetic circuit with a secondary element.

BRIEF DESCRIPTION OF THE DRAWINGS

Below, preferred exemplary embodiments of the system according to the invention are described in more detail with reference to figures. In the figures the same reference characters are used for identical items. The following are shown.

DETAILED DESCRIPTION

Figure 1:
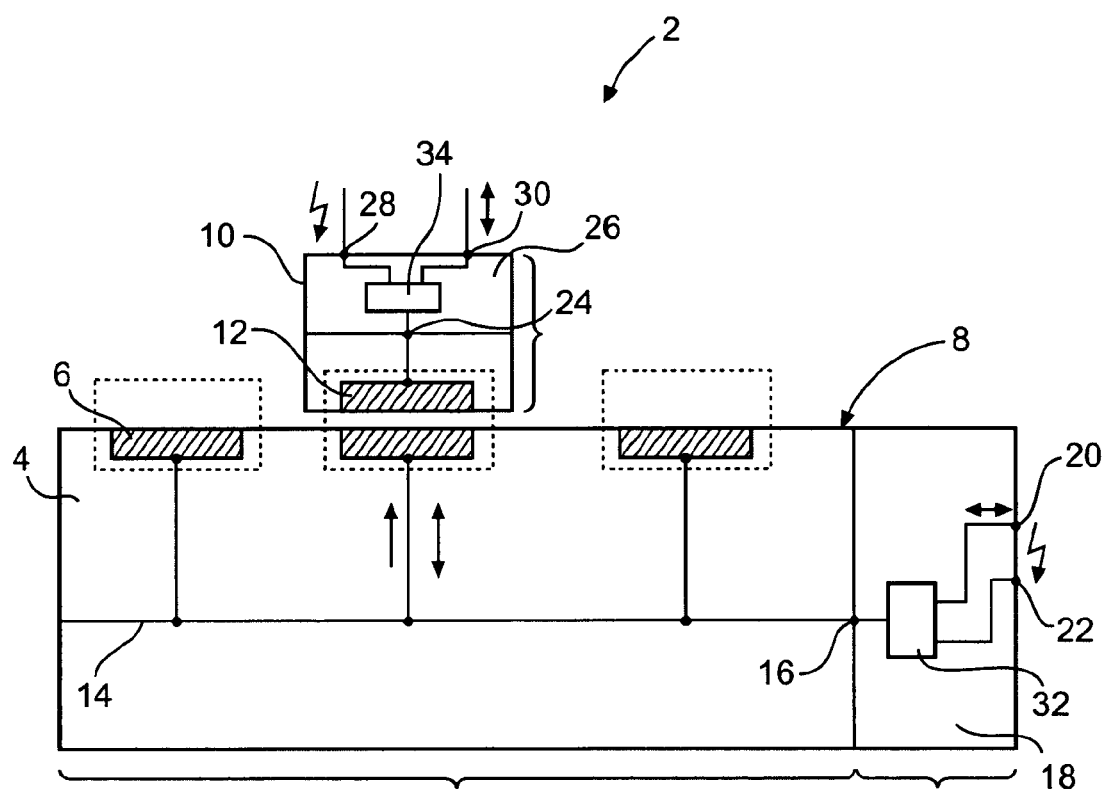
FIG. 1: a diagrammatic overview of the system according to the invention.

FIG. 1 shows a diagrammatic view of the system 2 according to the invention. In a first vehicle component 4, for example three primary elements 6 are arranged on a surface 8 above which a second vehicle component 10 with a secondary element 12 may be positioned. In order to establish a connection for the transmission of electrical power and data it is necessary for a magnetic circuit to form between the secondary element 12 and one of the primary elements 6, for example with the middle one of the three primary elements 6, as indicated by a dashed line.

In each case the primary elements 6 and the secondary element 12 have a core that comprises windings. The winding of a primary element 6 is designated a "primary winding", while the winding of a secondary element 12 is designated a "secondary winding". The primary windings of the primary elements 6 are connected to the line 14 which in turn is connected to a signal output port 16 of a first control unit 18. It should be noted that spatial proximity between the first control unit 18 and the vehicle component 4 is not necessary. The first control unit could also be operated clearly away from the vehicle component 4. The first control unit 18 (also designed the "rail control") further comprises a data input port 20 and a voltage input port 22. The data input port 20 may, for example, be connected to an already existing data line or a data bus in the respective vehicle, while the voltage input port 22 may be connected to an onboard voltage supply. The secondary winding of the secondary element 12 is connected to a signal input port 24 of a second control unit 26 that comprises a voltage output port 28 and a data output port 30. From the voltage output port 28 a correspondingly prepared supply voltage may be picked off, which may be used for operating devices within the second vehicle component 10.

The data from the data output port 30 may be used for a multitude of different applications in which data or device states need to communicate with central devices in the vehicle. For the purpose of providing a suitable output signal at the signal output port 16, the first control unit 18 comprises a modulator 32, which modulator 32 modulates the frequency of the electrical voltage at the voltage input port 22 depending on the incoming data at the data input port 20. To this effect the first control unit 18 or the modulator 32 preferably comprises a rectifier (not shown) which from the incoming voltage provides direct voltage at the voltage input port 22. By means of a so-called "chopper" it is possible to generate an alternating voltage with a carrier frequency from the rectified voltage. Lastly, the modulator 32 modulates the frequency of the alternating voltage around the carrier frequency and provides it at the signal output port 16.

In order to select a corresponding carrier frequency that is suitable for transmitting large data flows, it should be kept in mind that with increasing carrier frequency a decreasing quantity of ferrites is used in the production of a suitable coil core for the windings, but the magnetic losses also increase as the carrier frequency increases. For example, a carrier frequency of approximately 100 kHz could be used, by means of which it would be possible to achieve data transmission rates in the region of 115 kbit/s or more. However, these values should explicitly not be interpreted as limiting the invention, instead they only serve to describe the system according to the invention more concretely with reference to exemplary parameters that may be used. Depending on the requirements of data-consuming devices or the like, other frequencies and other bit rates may be sensible and preferred.

In the second control unit 26, analogous to the design of the first control unit 18, there is a demodulator 34 that from the regular frequency deviations of the signal at the signal input port 24 demodulates the corresponding data and provides it at the data output port 30. After demodulation, the present alternating voltage with the modulated frequency may be converted to commonly used values so that for example an alternating voltage with a frequency of 400 Hz in an aircraft environment could be output at 50 Hz or as direct voltage. In this way electrical consumers may be operated at the voltage output port 28.

In order to reduce the number of necessary first control units 18 it is imaginable to combine several primary windings to form a segment, which primary windings (6) are driven by a shared first control unit 18.

Figure 2A:
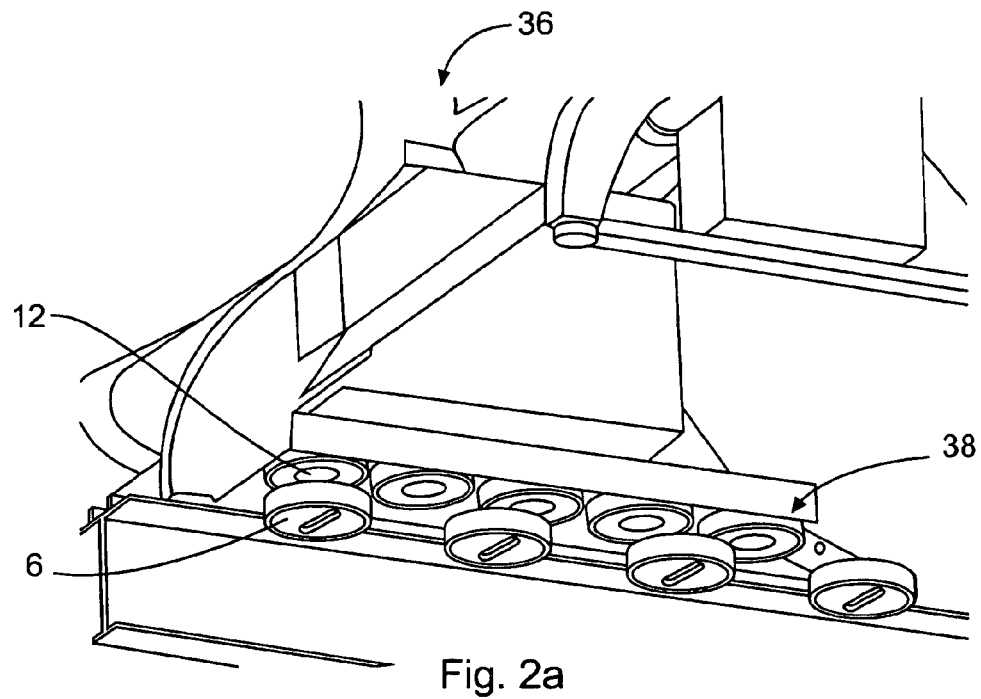
FIG. 2a: a three-dimensional view of a first exemplary embodiment.

FIG. 2a shows a first exemplary embodiment of the arrangement of primary elements 6 and secondary elements 12. As an example, the primary elements 6 are arranged in or on a vehicle floor, which for the sake of clarity is not shown in the image FIG. 2a. Due to the fact that there is a floor between the primary elements 6 and the secondary elements 12 the individual pairs of secondary element 12 and primary element 6 are spaced apart from each other. With the knowledge of the predetermined distance between these two elements 6 and 12 the windings and the ferrite cores in the elements 6 and 12 need to be matched so that optimum transmission is ensured.

Furthermore, the first exemplary embodiment is characteristic in that the primary elements 6 are designed as round can-shaped bodies that extend in longitudinal direction along the vehicle floor, preferably so as to be equidistantly spaced apart. The underside 38 of a vehicle seat 36 comprises a multitude of secondary elements 12 that are also designed as round and can-shaped bodies. In the case shown, the distance between the secondary elements 12 is less than the distance between the primary elements 6. This is due to the fact that, for example, in an aircraft cabin a seat pitch of one inch is specified. With the arrangement shown in FIG. 2a it is possible to implement two elements 6 and 12 that are arranged directly one above the other in any seat position that differs by one inch from another seat position. In the case shown, the front primary element 6 would be arranged directly underneath the front secondary element 12. If the seat were to be slid further forward by one inch, then the middle secondary element 12 would be located above the second primary element 6. If the seat 36 is slid forward by a further inch, the last secondary element 12 would be arranged above the third primary element from the front, and would form a coupled transmission system with said third primary element.

Figure 2B:
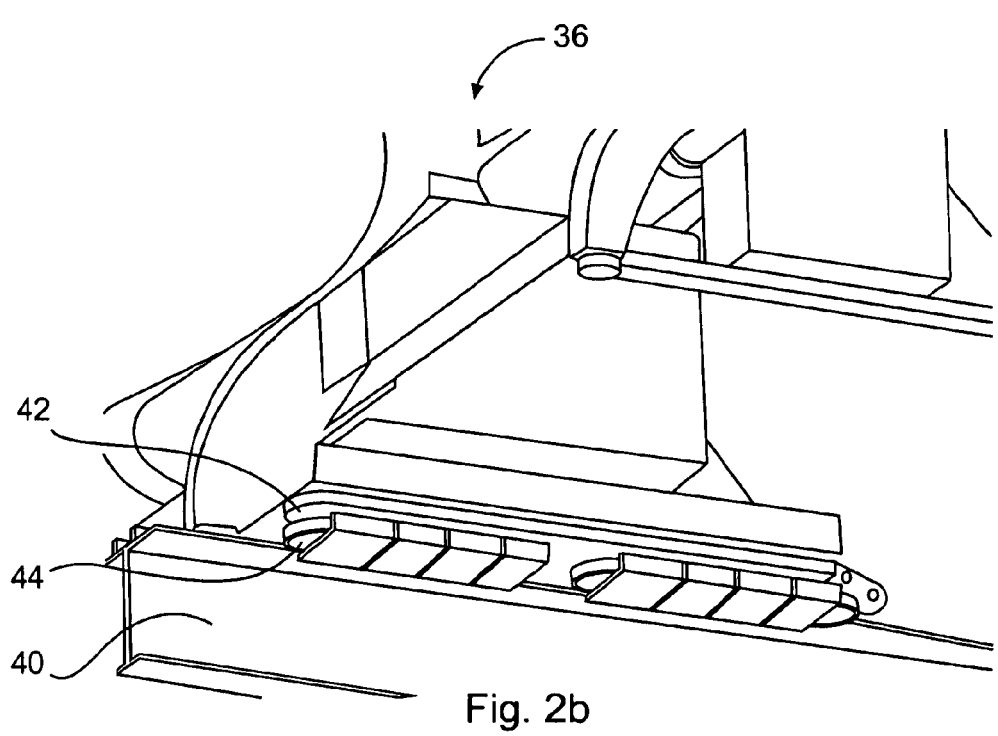
FIG. 2b: a three-dimensional view of a second exemplary embodiment.

FIG. 2b shows that it is not only relatively small and compact primary elements 6 and secondary elements 12 that are possible, but also elongated elements that essentially extend parallel to a seat attachment rail 40. Thus, FIG. 2b shows an elongated secondary element 42 that extends along the entire length of the housing 38 of the seat 36. Underneath the secondary element 42 two elongated primary elements 44 are arranged, one or both of which may form a coupled transmission system together with the secondary element 42.

Figure 3A:
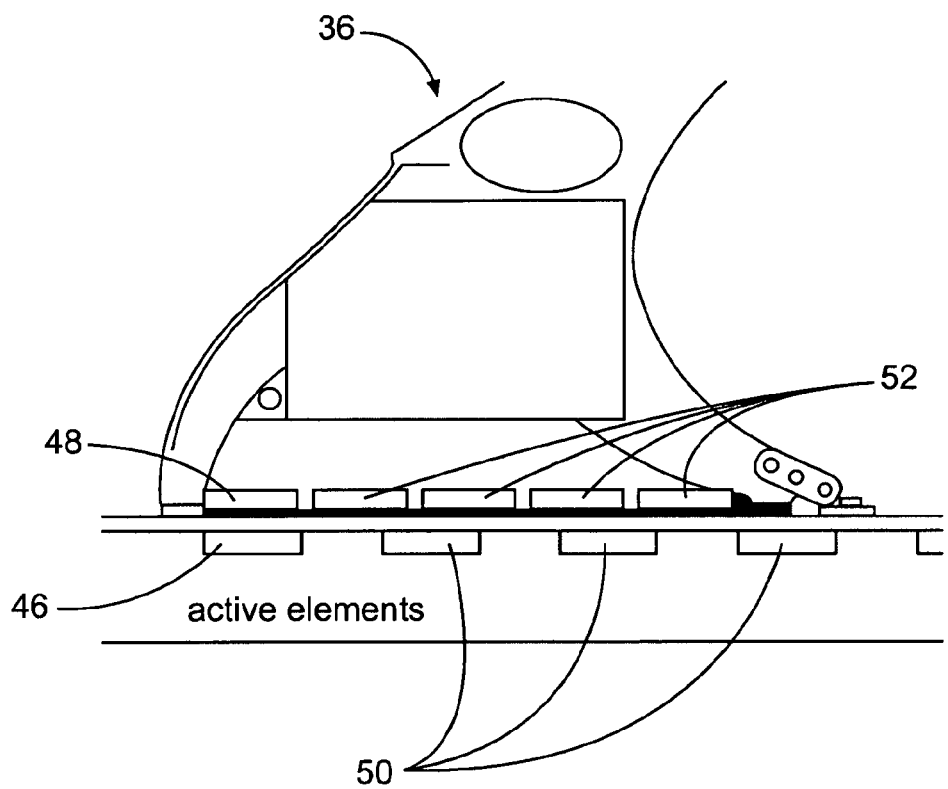
FIG. 3a: a lateral view of the system according to the invention.

In the arrangement of primary elements 6 and secondary elements 12 it is preferred for only that primary element 6 to remain active that has a secondary element 12 arranged above it. FIG. 3a shows an active primary element 46 above which a secondary element 48 is precisely positioned. This combination of a secondary element 48 and a primary element 46 is optimal from a power supply point of view, because the distance between the two elements 46 and 48 is as short as possible. The remaining primary elements 50 and secondary elements 52 do not have such an optimal arrangement from the point of view of power supply, so that the remaining primary elements 50 in relation to the seat 36 are deactivated in order to reduce the electromagnetic interference effects (EMI) of the system arrangement. This may take place in that by measuring in the winding of the primary element 50 concerned, it may be determined that current values and voltage values have been shown that would indicate that there is no secondary element 52 in a magnetic circuit.

Figure 3B:
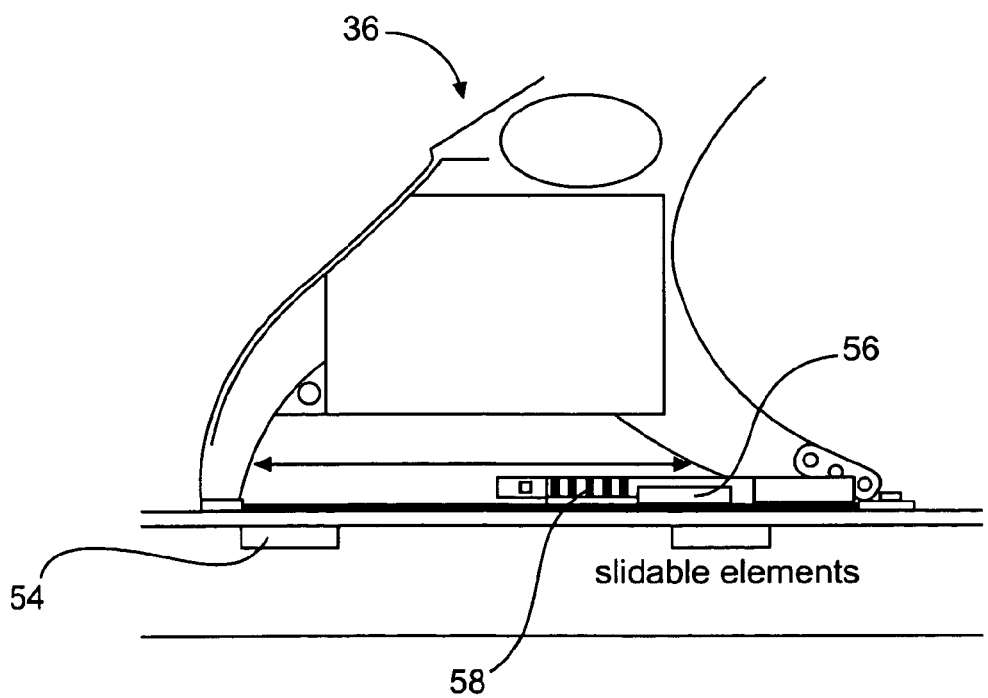
FIG. 3b: a lateral view of a further exemplary embodiment of the system according to the invention.

FIG. 3b shows an option of saving primary elements 54. To this effect on the seat 36 only a single secondary element 56 is arranged, which is however held so as to be slidable in longitudinal direction of the aircraft cabin. At the same time the secondary element 56 is coupled to the second control unit by way of a connecting element 58. This makes it possible to install only a single secondary element 56, and to position it as optimally as possible above a primary element 54. In this way the number of primary elements 54 may be reduced, because the adjustment option of the secondary element 56 extends over the entire lower region of the seat 36 so that, as shown in FIG. 3b, two primary elements 54 for a seat width would be adequate.

Figure 4A:
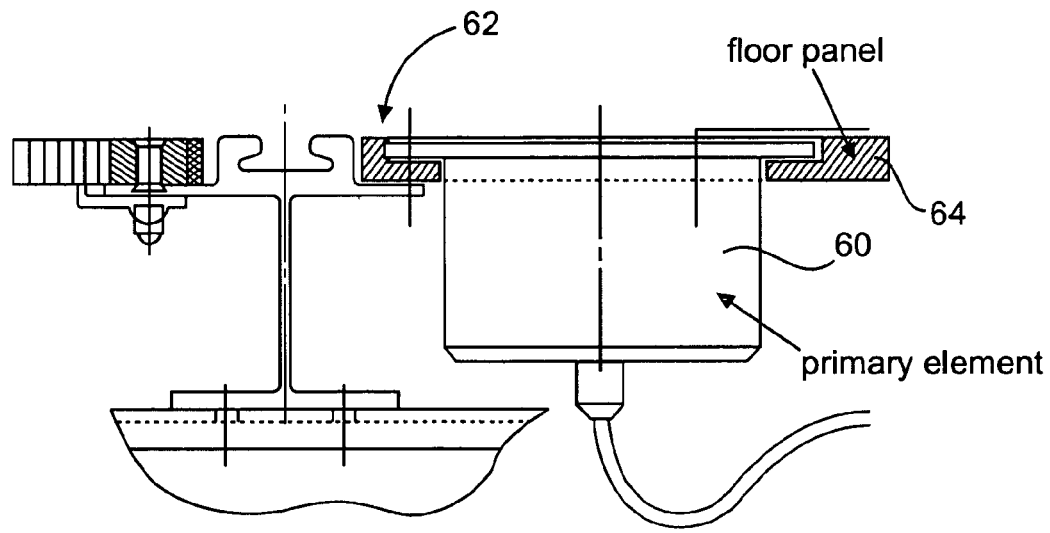
FIG. 4a: a lateral section view of a primary element integrated in a floor.
Figure 4B:
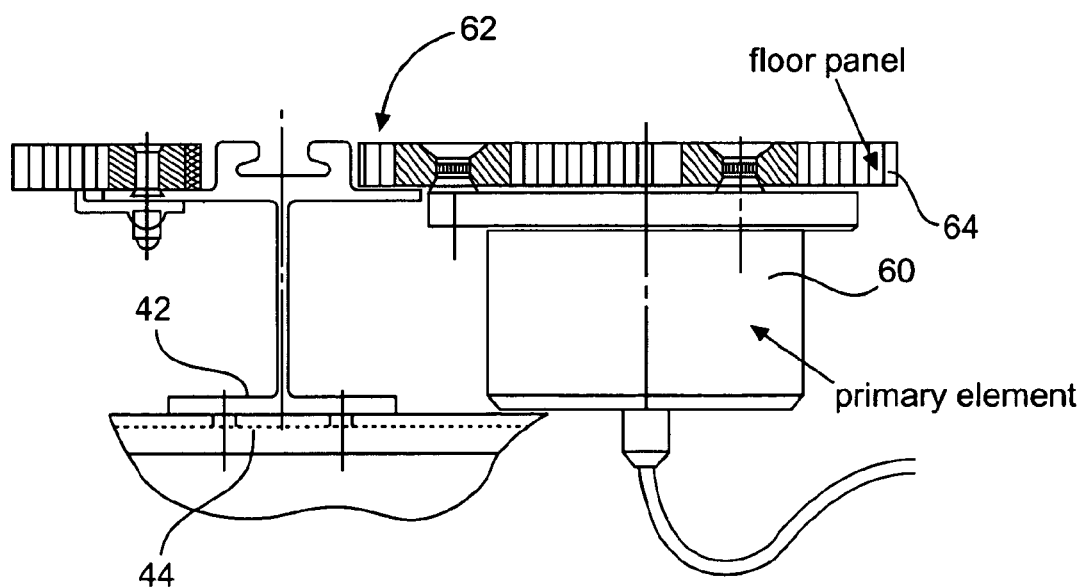
FIG. 4b: a lateral section view of a primary element arranged underneath a floor.

Finally, FIGS. 4a and 4b show options of integrating a primary element 60 in a floor 62 of a cabin of a vehicle. In FIG. 4a the primary element 60 is arranged in a floor panel 64 such that the top of the primary element 60 extends flush with the top of the floor panel 64. In FIG. 4b the primary element is located directly underneath the floor panel 64. If a floor panel 64 made of a magnetically non-conductive material, for example of a honeycomb core material comprising glass-fibre reinforced plastic, from the point of view of magnetic coupling (magnetic efficiency) it is fine if the primary element 60 is arranged underneath the floor panel 64. If a floor panel 64 is used that interferes with the magnetic flux between the primary element 60 and a secondary element that is arranged above it, the primary element 60 would have to be integrated in the floor panel 64, as shown in FIG. 4*a*. This would result in increased costs because in particular in the case of light-weight floor panels it could be expensive to produce frames for primary elements 60. Finally, it should be taken into account that the distance between the primary element 60 and a secondary element arranged above cannot be selected at will, but that instead the smallest-possible distance should always be selected. However, it is imaginable and also preferred to provide a distance of between 15 and 20 mm between the primary element 60 and a secondary element. This is associated with an advantage in that the top of the floor panel is flat, without any uneven positions, so that nothing prevents the use of a conventional floor covering without the need for additional cut-outs or the like. This results in the quality of the floor being clearly improved when compared to that of other systems for contactless data- and power transmission or compared to that of the conventional wired system.

List of Reference Characters
2 System according to the invention
4 First vehicle component
6 Primary winding
8 Surface of the first vehicle component
10 Second vehicle component
12 Secondary winding
14 Signal line
14 Signal output port of the first control unit
18 First control unit
20 Data input port
22 Voltage input port
24 Signal input port of the second control unit
26 Second control unit
28 Voltage output port
30 Data output port
32 Modulator
34 Demodulator
36 Seat
38 Housing for secondary elements
40 Seat attachment rail
42 Elongated secondary element
44 Elongated primary element
46 Active primary element
48 Active secondary element
50 Inactive primary elements
52 Inactive secondary elements
54 Primary element
56 Slidable secondary element
58 Connecting element
60 Primary element
62 Floor
64 Floor panel

The invention claimed is:

1. A system for contactless data and power transmission between a first vehicle component and a seat or a Passenger Service Unit (PSU), comprising:
at least one first control unit with a voltage input port, a data input port and a signal output port,
at least one second control unit with a signal input port, a data output port and a voltage output port, and
a plurality of primary windings distributed on the first vehicle component, the primary windings being distanced to one another with a corresponding plurality of first cores,
at least one secondary winding in at least one second core at the seat or the PSU, the at least one secondary winding forming at least one transducer with one of the plurality of primary windings,
wherein the primary windings are connectable to the signal output port of the first control unit, and the at least one secondary winding is connectable to the signal input port of the second control unit,
the first control unit is adapted to generate an alternating voltage at the signal output port, from an electrical voltage present at the voltage input port, with the frequency of said alternating voltage being modulated depending on the data that is input at the data input port,
the second control unit is adapted to demodulate the frequency-modulated alternating voltage present at the signal input port to extract and provide the data at the data output port, and to provide at the voltage output port a voltage that has been prepared for use in an electrical consumer, and
wherein the seat or the PSU is selectively positionable relative to the first vehicle component such that at least one secondary winding arranged in the seat or the PSU is arranged so as to be adjacent to at least one primary winding for forming a magnetic circuit.

2. The system of claim 1, wherein at least one of the primary winding and the secondary winding is encapsulated in a housing.

3. The system of claim 1, wherein the first vehicle component is a fixed installation in the vehicle, and the second vehicle component is positionable in various positions relative to the first vehicle component.

4. The system of claim 1, in which the primary windings are arranged so as to be substantially equidistant.

5. The system of claim 1, wherein the first vehicle component is arranged on a floor side of a cabin, and the floor is between the secondary winding and the primary windings.

6. The system of claim 1, wherein a plurality of primary windings are combined to form a segment, and wherein the primary windings are driven by a shared first control unit.

7. The system of claim 1, wherein primary windings that are not arranged adjacent to the least one secondary windings are deactivatable.

8. An aircraft comprising a system for contactless data and power transmission comprising:
a first vehicle component, and
a seat or a Passenger Service Unit (PSU), the system further comprising:
at least one first control unit with a voltage input port, a data input port and a signal output port,
at least one second control unit with a signal input port, a data output port and a voltage output port,
a plurality of primary windings distributed on the first vehicle component, the primary windings being distanced to one another with corresponding plurality of first cores,
at least one secondary winding in at least one second core at the seat or the PSU, the at least one secondary winding forming at least one transducer with one of the plurality of primary windings,
wherein the primary winding is connectable to the signal output port of the first control unit, and the at least one secondary winding is connectable to the signal input port of the second control unit,
the first control unit is adapted to generate an alternating voltage at the signal output port, from an electrical voltage present at the voltage input port, with the frequency of said alternating voltage being modulated depending on the data that is input at the data input port, and
the second control unit is adapted to demodulate the frequency-modulated alternating voltage present at the signal input port to extract and provide the data at the data output port, and to provide at the voltage output port a voltage that has been prepared for use in an electrical consumer, and wherein the seat or the PSU is selectively positionable relative to the first vehicle component such that at least one secondary winding arranged in the seat or the PSU is arranged so as to be adjacent to at least one primary winding for forming a magnetic circuit.

* * * * *